(12) United States Patent
Li et al.

(10) Patent No.: US 9,965,231 B2
(45) Date of Patent: May 8, 2018

(54) PRINTER DRIVER AND INFORMATION PROCESSING DEVICE

(71) Applicant: Konica Minolta, Inc., Chiyoda-ku, Tokyo (JP)

(72) Inventors: Xingyue Li, Hino (JP); Yoshiyuki Harada, Musashino (JP); Chie Ichikawa, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days. days.

(21) Appl. No.: 15/196,500

(22) Filed: Jun. 29, 2016

(65) Prior Publication Data
US 2017/0024170 A1    Jan. 26, 2017

(30) Foreign Application Priority Data

Jul. 23, 2015 (JP) ................................ 2015-145414
Jul. 23, 2015 (JP) ................................ 2015-145415

(51) Int. Cl.
*G06F 3/12* (2006.01)
*H04N 1/00* (2006.01)

(52) U.S. Cl.
CPC .......... *G06F 3/1228* (2013.01); *G06F 3/1205* (2013.01); *G06F 3/1225* (2013.01);
(Continued)

(58) Field of Classification Search
CPC .... G06F 3/1228; G06F 3/1205; G06F 3/1225; G06F 3/1286; H04N 1/00411; H04N 1/00482; H04N 2201/0094
See application file for complete search history.

(56) References Cited

U.S. PATENT DOCUMENTS

2004/0223182 A1  11/2004 Minagawa
2009/0237724 A1   9/2009 Furuya
(Continued)

FOREIGN PATENT DOCUMENTS

JP    2000-225754 A    8/2000
JP    2001-251525 A    9/2001
(Continued)

OTHER PUBLICATIONS

Office Action (Notice of Reasons for Rejection) dated Jul. 4, 2017, by the Japanese Patent Office in Japanese Patent Application No. 2015-145414, and an English Translation of the Office Action. (6 pages).

(Continued)

*Primary Examiner* — Iriana Cruz
(74) *Attorney, Agent, or Firm* — Buchanan Ingersoll & Rooney PC

(57) ABSTRACT

A printer driver operating in an information processing device transmitting print job data to printing devices causes the information processing device to function as: a configuration processing unit configured to hold configuration information about the printer driver, and generate configuration data; a user interface unit configured to generate a print setting screen, and cause a display unit to display the print setting screen; and a drawing unit configured to perform a drawing process on print job data generated in the information processing device, wherein the drawing unit includes specific drawing units prepared for respective model groups classifying the printing devices in accordance with attributes of models of the printing devices, the specific drawing units being configured to perform a model-group-specific drawing process, and selects an appropriate specific drawing unit from among the plurality of specific drawing units, to (Continued)

perform a drawing process with the selected specific drawing unit.

12 Claims, 8 Drawing Sheets

(52) U.S. Cl.
CPC ....... *G06F 3/1286* (2013.01); *H04N 1/00411* (2013.01); *H04N 1/00482* (2013.01); *H04N 2201/0094* (2013.01)

(56) References Cited

U.S. PATENT DOCUMENTS

| | | | | |
|---|---|---|---|---|
| 2011/0102830 | A1* | 5/2011 | Naitoh | G06F 3/1204 358/1.15 |
| 2012/0002222 | A1 | 1/2012 | Ohara | |
| 2012/0044534 | A1* | 2/2012 | Ichikawa | G06F 3/1204 358/1.15 |
| 2016/0216175 | A1* | 7/2016 | Iwasaki | G03G 15/5075 |
| 2017/0017447 | A1* | 1/2017 | Saigusa | G06F 3/1255 |

FOREIGN PATENT DOCUMENTS

| | | |
|---|---|---|
| JP | 2003-044374 A | 2/2003 |
| JP | 2004126940 A | 4/2004 |
| JP | 2004265061 A | 9/2004 |
| JP | 2006-107388 A | 4/2006 |
| JP | 2007200247 A | 8/2007 |
| JP | 2009223834 A | 10/2009 |
| JP | 2011133994 A | 7/2011 |
| JP | 2012014634 A | 1/2012 |
| JP | 2012-043161 A | 3/2012 |
| JP | 2013-131126 A | 7/2013 |
| JP | 2014-153768 A | 8/2014 |
| JP | 2014-228954 A | 12/2014 |

OTHER PUBLICATIONS

Office Action (Notice of Reasons for Rejection) dated Jul. 11, 2017, by the Japanese Patent Office in Japanese Patent Application No. 2015-145415, and an English Translation of the Office Action. (8 pages).

English Translation of the Office Action (Notice of Reasons for Rejection) dated Sep. 26, 2017, by the Japanese Patent Office in corresponding Japanese Patent Application No. 2015-145415. (5 pages).

* cited by examiner

FIG. 5

```
-PageMediaSize
-Orientation
-...
-Model@DevOpt
    -Device A
    -Device B
    -Device C
-...
-Finisher XXX
-Finisher YVY
-...
```

FIG. 6

```
<Model name="Device A">
    Staple, Punch, ...
</Model>
<Model name="Device B">
    Staple, Fold, ...
</Model>
<Model name="Device C">
    Staple
</Model>
```

FIG. 7

```
<Model name="Device A">
    <PJLCreator>MFP_COLOR_TYPE3</PJLCreator>
    <PJLConverter>InputBin.TrayI->PJL.Tray4</PJLConverter>
</Model>
<Model name="Device B">
    <PJLCreator>MFP_COLOR_TYPE1</PJLCreator>
</Model>
<Model name="Device C">
    <PJLCreator>Printer_COLOR_TYPE1</PJLCreator>
</Model>
```

PRINTER DRIVER AND INFORMATION PROCESSING DEVICE

The entire disclosures of Japanese Patent Application Nos. 2015-145414 and 2015-145415, both filed on Jul. 23, 2015, including description, claims, drawings, and abstract are incorporated herein by reference in its entirety.

BACKGROUND OF THE INVENTION

Field of the Invention

The present invention relates to a printer driver and an information processing device.

Description of the Related Art

Version 3 printer drivers (V3 printer drivers) developed for Windows 2000 to Windows 7 have been provided as printer drivers that operate on operating systems (OS) of Windows (a registered trade name). A structure that uses the architecture of the V3 printer drivers is also known as a universal printer driver (UPD) that supports printing devices of various models with a single printer driver.

Since Windows 8 was released, manufacturers have developed version 4 printer drivers (V4 printer drivers) using new architecture. As the architecture of the V4 printer drivers is expected to be dominant in Windows to be released in the future, there is a demand for supplies of universal printer drivers based on the current architecture.

JP 2012-43161 A discloses a technology relating to a universal printer driver based on the architecture of the V3 printer drivers. According to JP 2012-43161 A, child drivers are prepared for respective models, and the child drivers are switched in accordance with the printing device designated as the output destination. In this structure, printing devices of two or more models can be supported by a single printer driver.

According to the technique disclosed in JP 2012-43161 A, one driver is compatible with two or more models. However, the respective child drivers in this driver are V3 printer drivers compatible with specific models, and these child drivers are simply switched to cope with the two or more models. Since a V4 printer driver has completely different architecture than a V3 printer driver, it is difficult to form a universal printer driver based on a V4 printer driver in the same manner as in forming a universal printer driver based on a V3 printer driver.

SUMMARY OF THE INVENTION

The present invention has been made in view of the above circumstances, and an object thereof is to provide a printer driver compatible with printing devices of various models, and an information processing device.

To achieve the abovementioned object, according to an aspect, a first invention provides a printer driver operating in an information processing device transmitting print job data to printing devices. The printer driver reflecting one aspect of the present invention causes the information processing device to function as: a configuration processing unit configured to hold configuration information about the printer driver, and generate configuration data in accordance with the configuration information; a user interface (UI) unit configured to generate a print setting screen in accordance with the configuration data, and cause a display unit to display the print setting screen; and a drawing unit configured to perform a drawing process on print job data generated in the information processing device, in accordance with the configuration data generated by the configuration processing unit. In this case, the drawing unit includes a plurality of specific drawing units prepared for respective model groups classifying the printing devices in accordance with attributes of models of the printing devices, each of the specific drawing units being configured to perform a model-group-specific drawing process, and selects an appropriate specific drawing unit from among the plurality of specific drawing units, to perform a drawing process with the selected specific drawing unit.

According to the first invention, the drawing unit preferably further includes a common drawing unit configured to perform a drawing process common among models of the printing devices, and performs a drawing process with the selected specific drawing unit and the common drawing unit.

According to the first invention, the drawing unit preferably selects one of the specific drawing units in accordance with the model group to which the model of a printing device selected by a user belongs, the selected printing device being of the printing devices.

To achieve the abovementioned object, according to an aspect, a second invention provides an information processing device transmitting print job data to printing devices, and the information processing device reflecting one aspect of the present invention comprises: a processor; and a storage device storing a printer driver to be executed by the processor. The processor has functions including: a configuration processing unit configured to hold configuration information about the printer driver, and generate configuration data in accordance with the configuration information; a user interface (UI) unit configured to generate a print setting screen in accordance with the configuration data, and cause a display unit to display the print setting screen; and a drawing unit configured to perform a drawing process on print job data generated in the information processing device, in accordance with the configuration data generated by the configuration processing unit. The drawing unit includes a plurality of specific drawing units prepared for respective model groups classifying the printing devices in accordance with attributes of models of the printing devices, each of the specific drawing units being configured to perform a model-group-specific drawing process, and selects an appropriate specific drawing unit from among the plurality of specific drawing units, and perform a drawing process with the selected specific drawing unit.

According to the second invention, the drawing unit preferably further includes a common drawing unit configured to perform a drawing process common among models of the printing devices, and performs a drawing process with the selected specific drawing unit and the common drawing unit.

According to the second invention, the drawing unit preferably selects one of the specific drawing units in accordance with the model group to which the model of a printing device selected by a user belongs, the selected printing device being of the printing devices.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is an explanatory diagram showing an example of common configuration data formed with a GPD file;

FIG. 6 is an explanatory diagram showing an example of functional definitions;

FIG. 7 is an explanatory diagram showing an example of model group information;

DESCRIPTION OF THE PREFERRED EMBODIMENTS

Hereinafter, an embodiment of the present invention will be described with reference to the drawings. However, the scope of the invention is not limited to the illustrated examples.

Figure 1:
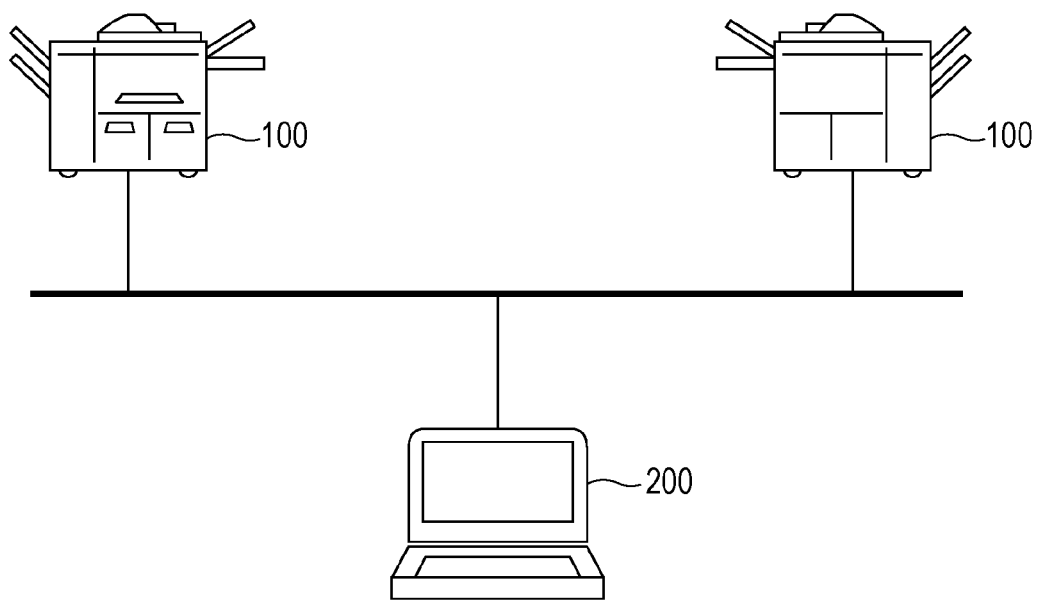
FIG. 1 is a diagram for explaining the configuration of a print control system according to an embodiment.

FIG. 1 is a diagram for explaining the configuration of a print control system according to this embodiment. The print control system according to this embodiment includes printing devices 100 and a PC 200 that transmits print job data to the printing devices 100. The printing devices 100 and the PC 200 are connected to a network, such as a local area network (LAN), so that they can communicate with one another. In this embodiment, two printing devices 100 and one PC 200 are provided. The two printing devices 100 are of different models from each other. For example, one of the printing devices 100 is a multifunction peripheral (MFP), and the other one of the printing devices 100 is a printer. The numbers of printing devices 100 and PCs 200 are not limited to the above, and the network may include an external network, such as the Internet.

The printing devices 100 each has a document read function of reading an original document, and an image formation function of forming an image on a paper sheet in accordance with image data. The printing devices 100 can also have a post-processing function of performing post-processing on a paper sheet having an image formed thereon.

Figure 2:
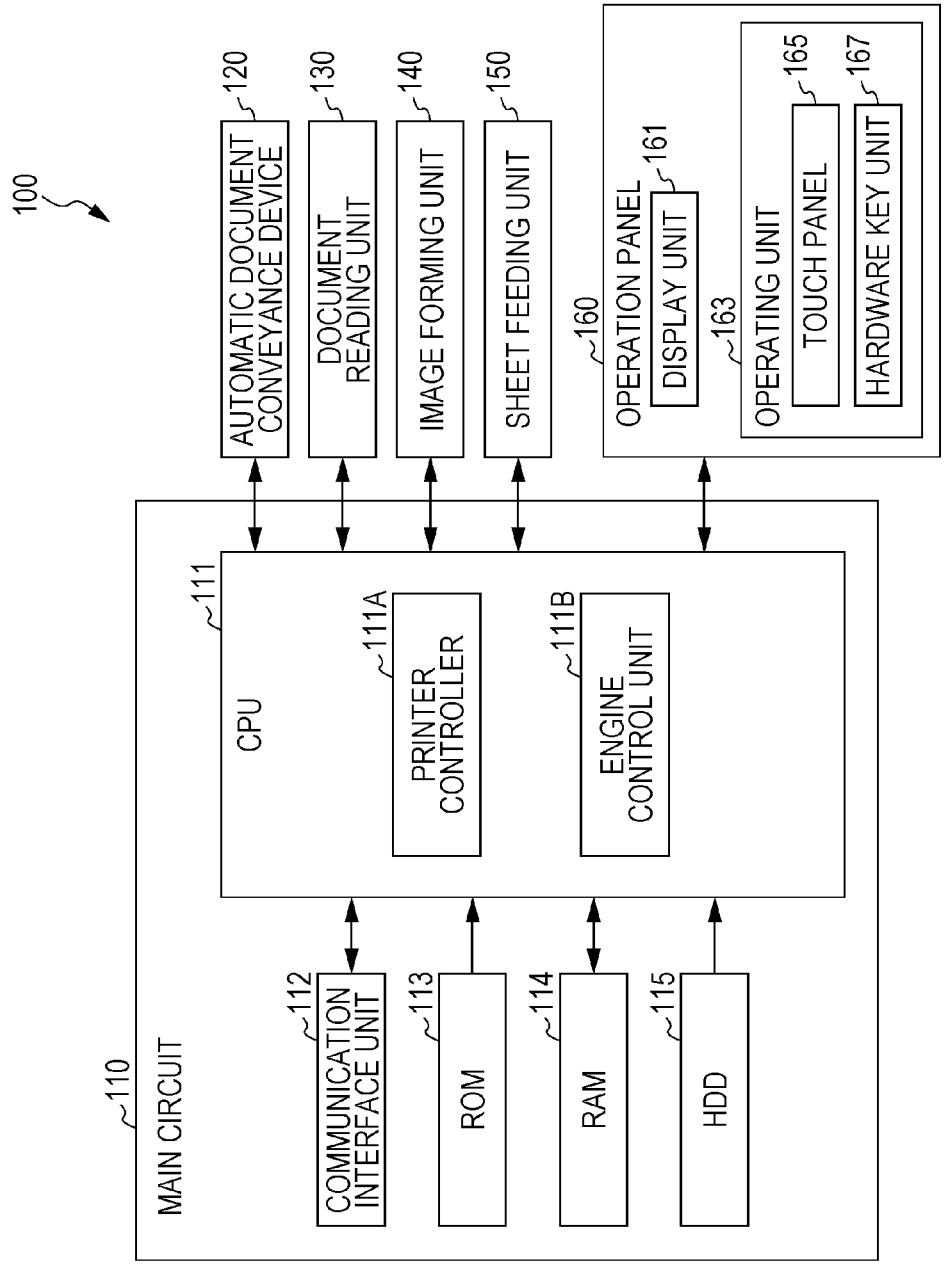
FIG. 2 is a block diagram showing the structure of a printing device.

FIG. 2 is a block diagram showing the structure of a printing device 100. The printing device 100 includes a main circuit 110, an automatic document conveyance device 120, a document reading unit 130, an image forming unit 140, a sheet feeding unit 150, and an operation panel 160.

The automatic document conveyance device 120 conveys a document to the document reading unit 130. The document reading unit 130 reads the conveyed document, and outputs image data. The image forming unit 140 forms an image on a paper sheet in accordance with the image data. The sheet feeding unit 150 supplies the paper sheet to the image forming unit 140.

The operation panel 160 is provided on the upper surface of the printing device 100, and includes a display unit 161 and an operating unit 163. The display unit 161 is a display device such as a liquid crystal display (LCD) or an organic electro-luminescence display (ELD), and displays a command menu for users and information about image data. The operating unit 163 further includes a touch panel 165 formed on the display unit 161 and a hardware key unit 167 formed with keys, and receives inputs of data, such as various commands, characters, and numerals, through operations conducted by users.

The main circuit 110 includes a CPU 111, a communication interface unit 112, a ROM 113, a RAM 114, a hard disk drive (HDD) 115.

The CPU 111 is connected to the automatic document conveyance device 120, the document reading unit 130, the image forming unit 140, the sheet feeding unit 150, and the operation panel 160. In terms of functions, the CPU 111 includes a printer controller 111A and an engine control unit 111B.

The printer controller 111A has a function for processing print job data transmitted from the PC 200 serving as an information processing device. The printer controller 111A converts the print job data into image data (raster data), and outputs the image data to the engine control unit 111B.

The engine control unit 111B controls the entire printing device 100. The engine control unit 111B also performs an image formation process based on image data.

The communication interface unit 112 is the interface for connecting the printing device 100 to the network. The CPU 111 can communicate with the PC 200 via the communication interface unit 112.

The ROM 113 stores the program to be executed by the CPU 111, or the data necessary for executing the program. The RAM 114 is the work area to be used by the CPU 111 to execute the program. The RAM 114 also temporarily stores the image data that is output from the document reading unit 130.

The program to be executed by the CPU 111 is stored in the HDD 115. The CPU 111 loads the program into the RAM 114 from the HDD 115, and then executes the program.

Figure 3:
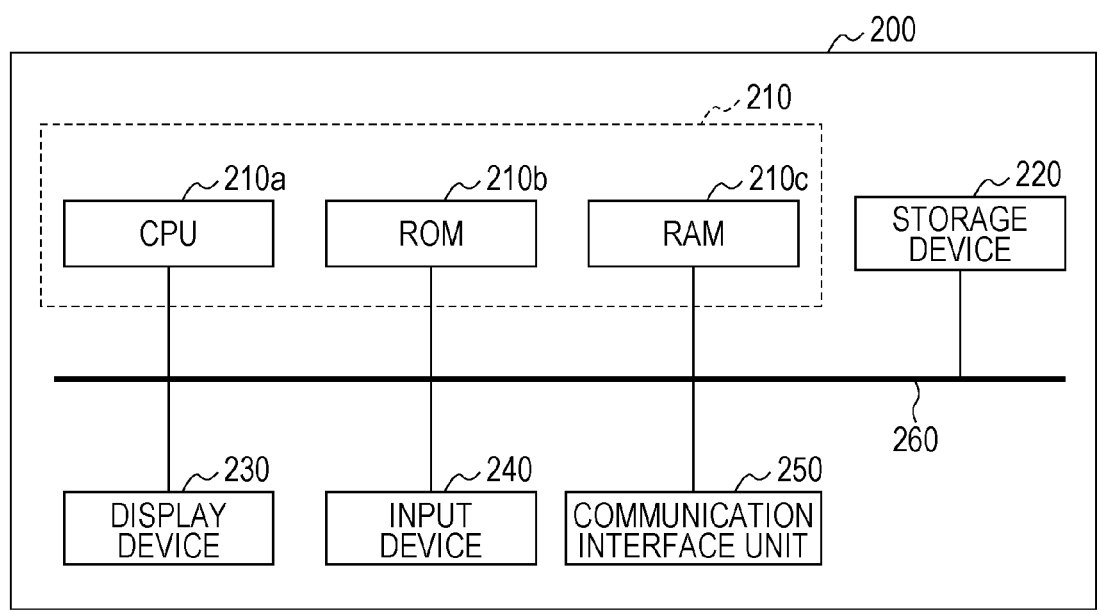
FIG. 3 is a block diagram showing the structure of a PC.

FIG. 3 is a block diagram showing the structure of the PC 200. The PC 200 (the information processing device) includes a control unit 210, a storage device 220, a display device 230, an input device 240, and a communication interface unit 250, which are connected to one another via a bus 260.

The principal components of the control unit 210 include a CPU 210a, a ROM 210b, and a RAM 210c. The CPU 210a (the processor) operates based on an operating system, and executes middleware, application programs, and the like. The ROM 210b stores the various kinds of programs to be executed by the CPU 210a, in the form of program codes that can be read by the CPU 210a. The ROM 210b also stores the data necessary for executing the programs. The RAM 210c is the memory that serves as a work storage area. The programs and the data stored in the ROM 210b and the storage device 220 are read by the CPU 210a, and are loaded into the RAM 210c. In accordance with the programs and the data loaded into the RAM 210c, the CPU 210a performs various kinds of processes.

The storage device 220 is a device formed with a hard disk drive (HDD), for example, and stores various kinds of programs, such as applications. The display device 230 is formed with a CRT, a liquid crystal display, or the like. The display device 230 (the display unit) displays various kinds of information, various kinds of messages, dialogs, and the like. The input device 240 is formed with a keyboard, a mouse, and the like, and is used by a user to perform input operations. The communication interface unit 250 is an interface that exchanges data with the printing devices 100 and external devices via the network.

For example, the PC 200 has Windows installed as its operating system. Applications (application programs) that operate on the operating system are installed in the PC 200.

A printer driver that operates on the operating system is also installed in the PC 200. The addition and deletion of the file related to the printer driver are managed by the operating system, and are performed when the printer driver is installed and uninstalled. The installed printer driver is stored in the system folder of Windows, and the file that is to operate as the printer driver on the operating system is stored in the system folder.

Figure 4:
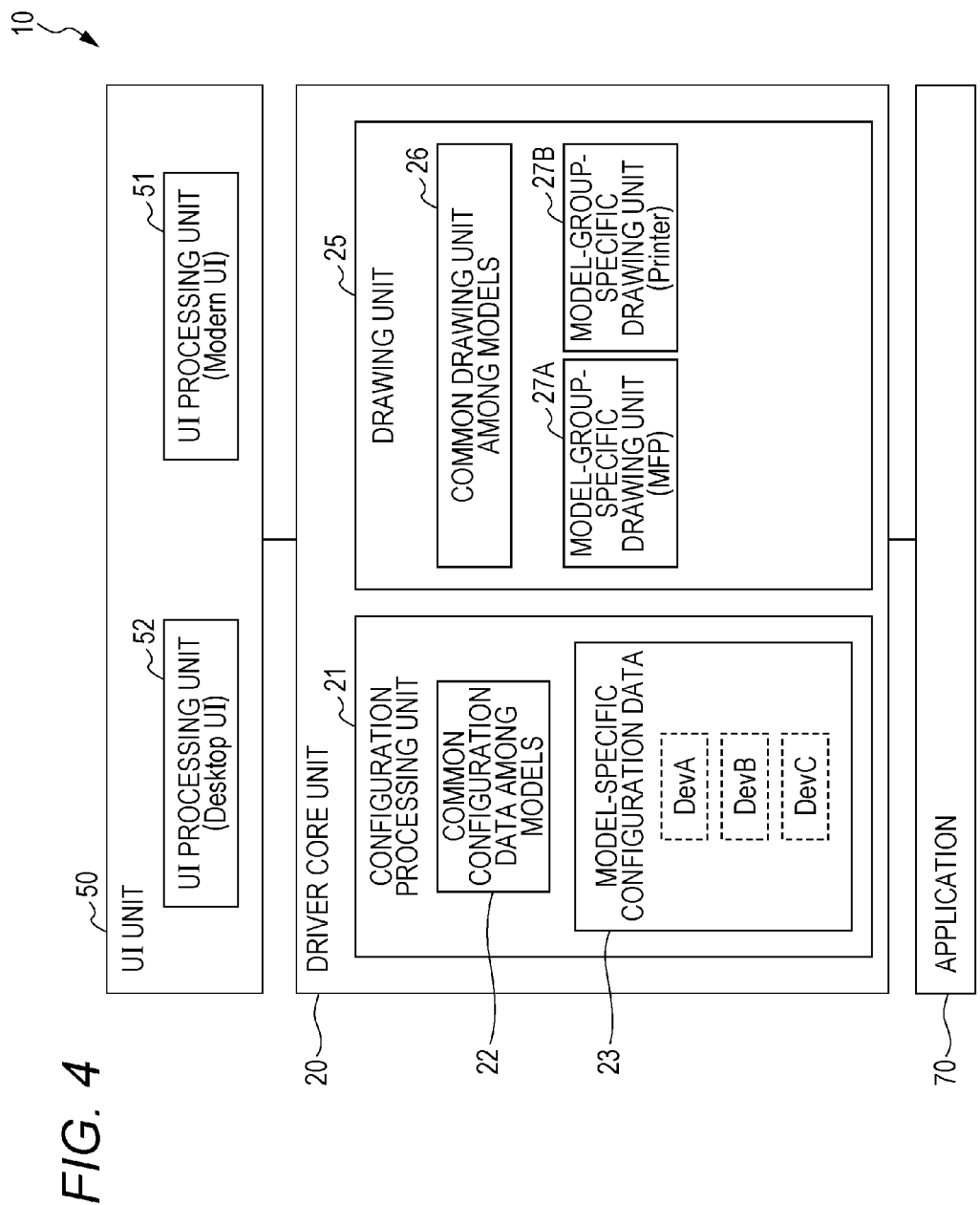
FIG. 4 is a diagram for explaining the structure of the control unit of the PC.

FIG. 4 is a diagram for explaining the structure of the control unit 210 of the PC 200. The CPU 210a loads the installed printer driver 10 into the RAM 210c and then executes the printer driver 10. By doing so, the CPU 210a executes the various functions provided by the printer driver 10. When a print instruction is issued by an application 70, the printer driver 10 (the control unit 210) generates data in a format compatible with a printing device 100, and then transmits the data as print job data to the printing device 100. The description language format of the print job data is a page description language (PDL), such as the printer control language (PCL). The print job data contains print data related to a document such as text, graphics, or an image, and print settings for forming an image of the print data on a paper sheet.

In this embodiment, the printer driver 10 is a V4 printer driver that operates on a Windows operating system. The printer driver 10 includes a driver core unit 20 and a user interface (UI) unit 50.

The driver core unit 20 includes a configuration processing unit 21 and a drawing unit 25.

The configuration processing unit 21 holds the configuration information about the printer driver 10, or the configuration information about the printing device 100 with which the printer driver 10 is compatible. The configuration information is information about the functional definitions that define the functions of the printing device 100. The configuration processing unit 21 also generates configuration data (a print ticket) in accordance with the configuration information, and performs various kinds of processes accompanying the configuration data. The configuration data is the data describing the print settings information, and includes information corresponding to the printing device 100 (the model) selected by the user. The generated configuration data includes information indicating which setting value is designated for each print setting related to the model. The generated configuration data also includes information about the model group to which the model of the printing device 100 selected by the user belongs. The generated configuration data is to be used by the drawing unit 25, the UI unit 50, and the application 70.

The configuration processing unit 21 includes common configuration data 22 and specific configuration data 23.

The common configuration data 22 is data that includes information (the common configuration information) about the functional definitions that are common among the models of the printing devices 100. The common configuration data 22 is defined by a configuration file, such as a generic printer description (GPD) file.

FIG. 5 is an explanatory diagram showing an example of the common configuration data 22 formed with a GPD file. As shown in the drawing, the common configuration data 22 defines the paper sheet size ("PageMediaSize") and the orientation of the paper sheet ("Orientation"), for example. The common configuration data 22 also includes the definition ("Model@DevOpt") of the function of switching compatible models, for example. The properties screen of the printer provided by the operating system is displayed in accordance with the description in the GPD file, and model switching can be performed through the properties screen of the printer.

The specific configuration data 23 is data that includes information (the specific configuration information) about the functional definitions of the respective functions specific to the printing devices 100, and information about the model group definitions that define the model groups to which the respective models belong. Here, the "model groups" classify the printing devices 100 in accordance with the attributes of the models, and one or more models are associated with each of the model groups. More than one set of the specific configuration data 23 (for example, the data corresponding to three models (DevA, DevB, and DevC)) is prepared in accordance with the models with which the printer driver 10 is compatible. The specific configuration data 23 is defined by a driver propertybag or the like storing a list of driver properties.

FIG. 6 is an explanatory diagram showing an example of the functional definitions. The functional definitions define the functions of the models (Device A, Device B, and Device C) of the printing devices 100. These functions include stapling, punching, and folding, for example.

FIG. 7 is an explanatory diagram showing an example of the model group definitions. The model group definitions define to which model groups including an MFP group and a printer group the models of the printing devices 100 belong. The model group definitions also define to which model groups including a color printing machine group and a monochrome printing machine group the respective models of the printing devices 100 belong.

In the examples shown in FIGS. 6 and 7, the functional definitions and the model group definitions are defined in different tags. However, the functional definitions and the model group definitions may be defined in the same tag.

Referring back to FIG. 4, the drawing unit 25 performs a drawing process (a rendering process) on print job data generated in the PC 200, in accordance with configuration data generated by the configuration processing unit 21. Specifically, the drawing unit 25 converts data (print job data) generated by the application 70 into print job data in a format such as PCL, in accordance with the configuration data supplied from the configuration processing unit 21.

Figure 8:
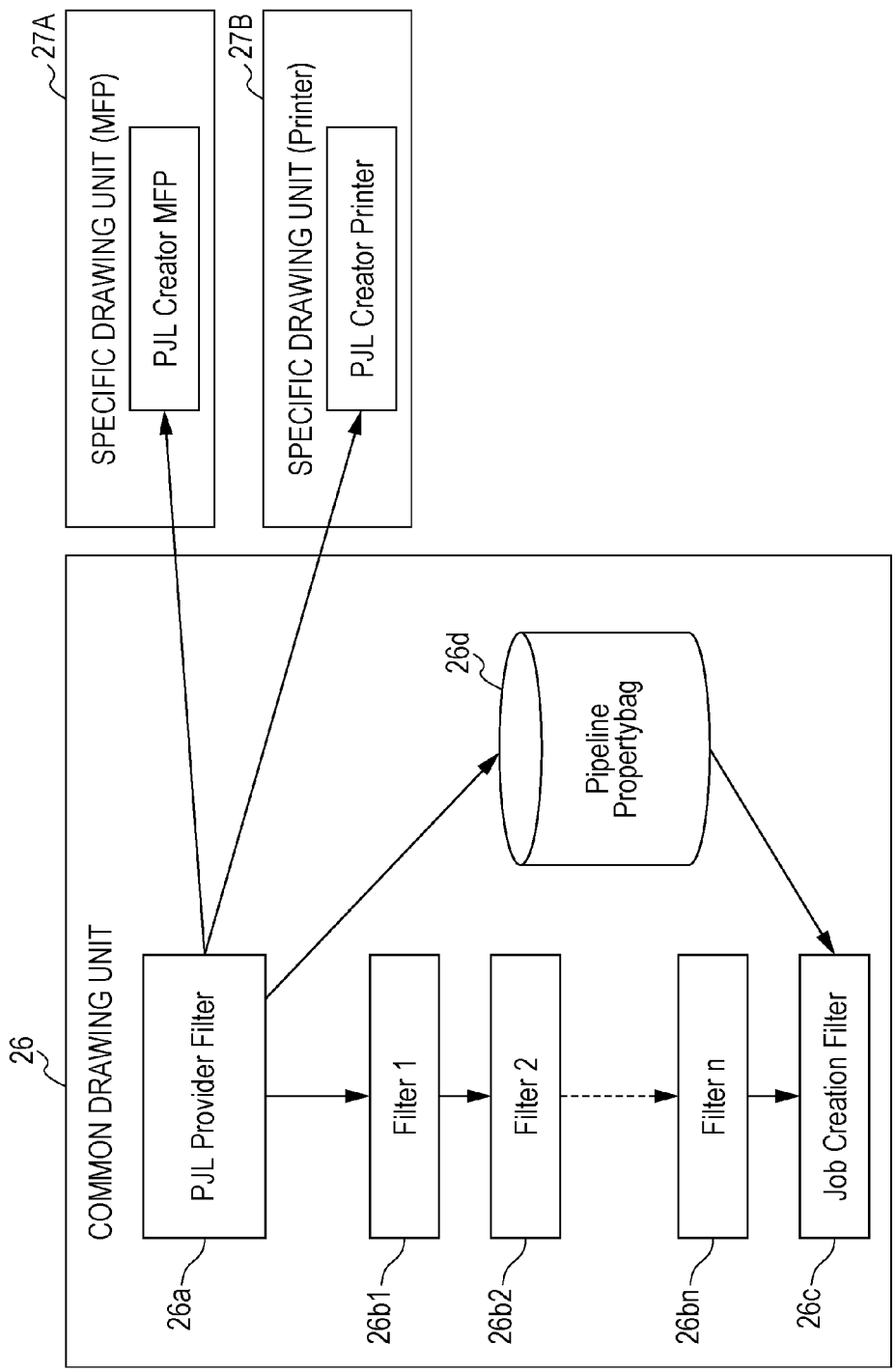
FIG. 8 is a diagram for explaining the structure of a drawing unit.

The drawing unit 25 includes a common drawing unit 26, and specific drawing units 27A and 27B. FIG. 8 is a diagram for explaining the structure of the drawing unit 25.

The common drawing unit 26 performs a drawing process that is common among the models of the printing devices 100. In the example shown in FIG. 8, the common drawing unit 26 includes a PJL (Printer Job Language) provider filter 26a, first through nth filters 26b1 through 26bn, a job creation filter 26c, and a pipeline propertybag 26d.

The specific drawing units 27A and 27B are prepared for the respective model groups, and perform drawing processes specific to the respective model groups. In this embodiment, the two specific drawing units 27A and 27B are prepared, and are compatible with an MFP model group and a printer model group.

In this drawing unit 25, in accordance with the information about the model group (the model group definitions) included in the configuration data generated in the configuration processing unit 21, the PJL provider filter 26a calls for the specific drawing unit 27A or 27B, whichever is compatible with the model of the printing device 100 selected by the user. After a drawing process is performed by the called specific drawing unit 27A or 27B, the drawing process common among the models is performed by the filters 26b1 through 26bn. Lastly, print job data is output from the job creation filter 26c, and is transmitted to the printing device 100.

Referring back again to FIG. 4, the UI unit 50 is the module for displaying the user interface for performing print setting. The UI unit 50 generates a print setting screen in accordance with the configuration data generated by the configuration processing unit 21, and causes the display device 230 to display the generated print setting screen.

In a V4 printer driver, the UI unit 50 includes two UI processing units 51 and 52. The UI processing unit 51 is designed for displaying the print setting screen for the modern UI of Windows 8. The other UI processing unit 52 is designed for displaying the print setting screen for a desktop UI. The two UI processing units 51 and 52 are modules common among the models of the printing devices 100. However, the two UI processing units 51 and 52 are dynamically set so that one of the UI processing units 51 and 52 displays a print setting screen in accordance with the model-specific configuration data generated by the configuration processing unit 21. With this, the print setting screen display is switched in accordance with the model selected by the user.

Processes to be performed by the PC 200 according to this embodiment are now described. In the control unit 210 of the PC 200, the CPU 210a loads the printer driver 10 into the RAM 210c, and executes the printer driver 10, to perform the respective processes described below.

Figure 9:
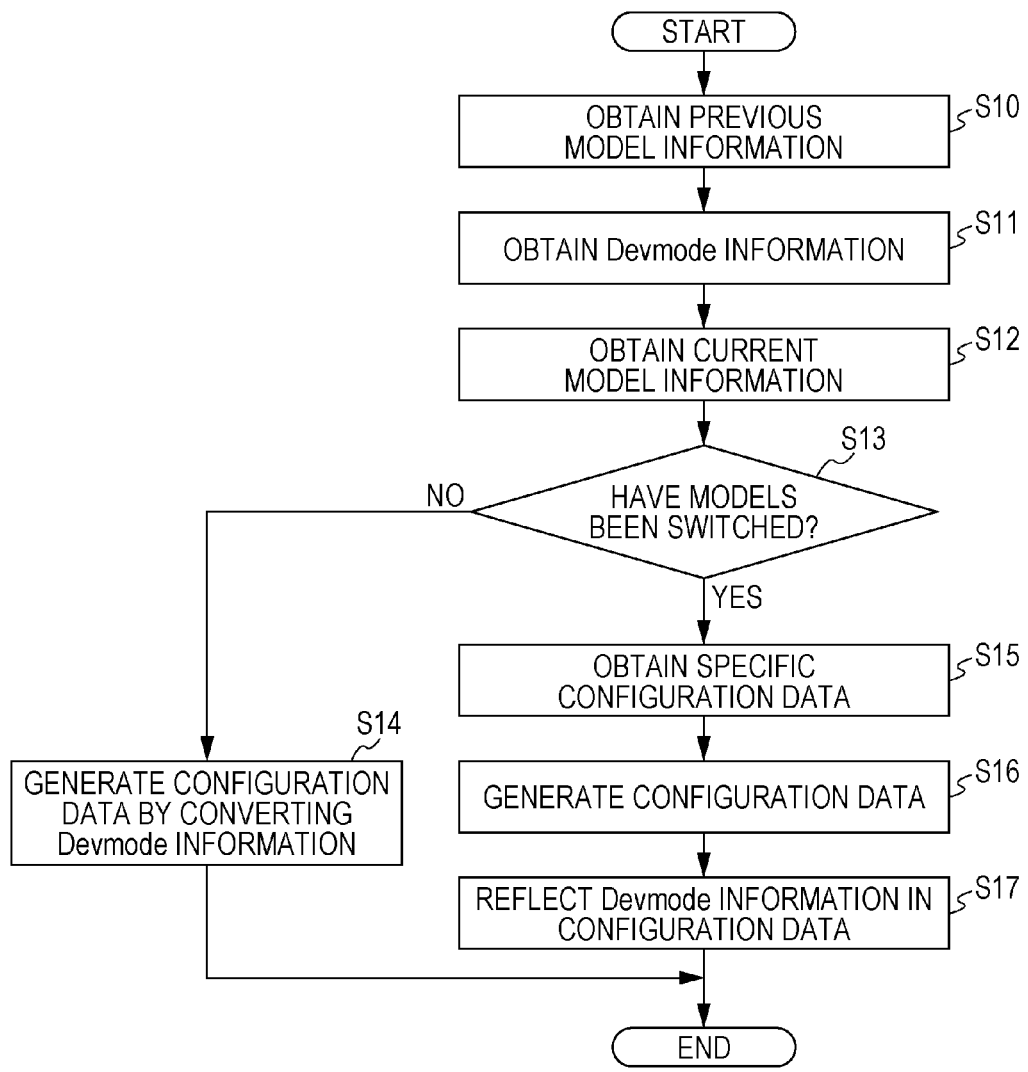
FIG. 9 is a flowchart showing a configuration data generation process to be performed by a configuration processing unit.

First, a configuration data generation process to be performed by the configuration processing unit 21 is described. FIG. 9 is a flowchart showing a configuration data generation process to be performed by the configuration processing unit 21. First, in step S10 (S10), the configuration processing unit 21 obtains the information about the model of the printing device 100 selected by the user last time.

In step S11 (S11), the configuration processing unit 21 obtains Devmode information stored in a Devmode structure. The Devmode structure is to be used by Windows, and the Devmode information includes the current print settings information.

In step S12 (S12), the configuration processing unit 21 obtains the information about the model of the printing device 100 selected by the user this time.

In step S13 (S13), the configuration processing unit 21 compares the current model with the previous model, and determines whether models have been switched. If models have not been switched, the result of step S13 is negative, and therefore, the process moves on to step S14 (S14). If models have been switched, on the other hand, the result of step S13 is positive, and therefore, the process moves on to step S15 (S15).

In step S14, the configuration processing unit 21 converts the Devmode information, to generate configuration data.

In step S15 (S15), on the other hand, the configuration processing unit 21 obtains the specific configuration data 23 corresponding to the current model.

In step S16 (S16), the configuration processing unit 21 generates configuration data in accordance with the common configuration data 22 and the specific configuration data 23 obtained in step S15. In this manner, the configuration data specific to the model selected by the user is generated.

In step S17 (S17), the configuration processing unit 21 compares the generated configuration data with the Devmode information. If the print setting items in the Devmode information and the print setting items in the configuration data share the same item, the configuration processing unit 21 reflects the Devmode information in the configuration data with respect to the shared print setting item. Consequently, the ultimate configuration data is generated.

The configuration data generated as above is to be used by the drawing unit 25, the UI unit 50, and the application 70.

Figure 10:
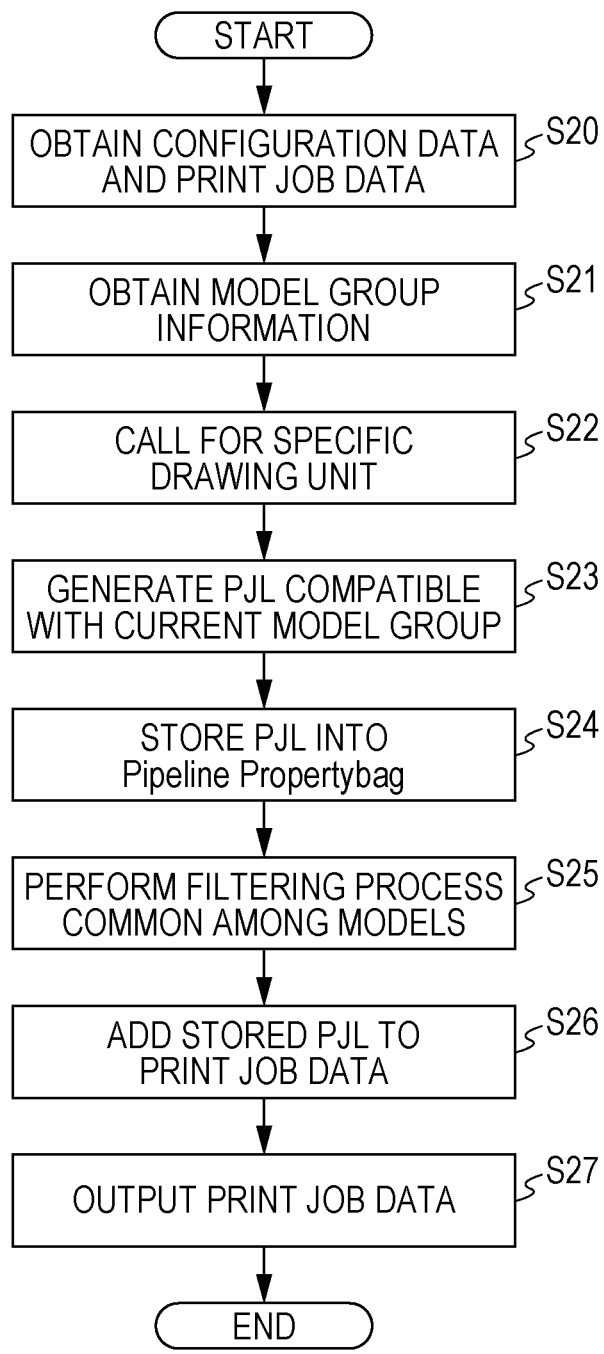
FIG. 10 is a flowchart showing a drawing process to be performed by the drawing unit.

Next, a drawing process to be performed by the drawing unit 25 is described. FIG. 10 is a flowchart showing a drawing process to be performed by the drawing unit 25. The example shown in FIG. 10 is based on the assumption that print job data is to be output in the PCL format.

First, in step S20 (S20), the drawing unit 25 obtains configuration data generated by the configuration processing unit 21, and print job data. In a V4 printer driver, the configuration data to be input to the drawing unit 25 is normally a print ticket, and the print job data is in the XPS (XML Paper Specification) format.

In step S21 (S21), the drawing unit 25 obtains, from the configuration data, the information about the model group to which the model of the printing device 100 selected this time belongs.

In step S22 (S22), the PJL provider filter 26a calls for the specific drawing unit 27A or 27B, whichever is compatible with the model group indicated in the model group information obtained in step S21.

In step S23 (S23), the called specific drawing unit 27A or 27B performs a drawing process (a drawing process specific to the model group) on the print job data, and generates PJL data corresponding to the model group to which the current printing device 100 belongs.

In step S24 (S24), the PJL provider filter 26a receives the generated PJL data from the specific drawing unit 27A or 27B, and stores the PJL data into the pipeline propertybag 26d.

In step S25 (S25), the filters 26b1 through 26bn each perform a filtering process on the print job data in accordance with the configuration data, to perform a drawing process (a drawing process common among the models). Although the respective filters 26b1 through 26bn are common among the models, the configuration data has been generated as model-specific data. In view of this, the drawing process in step S25 is performed under the model-specific conditions. The process in step S25 also includes conversion of the print job data in the XPS format to data in the PCL format.

In step S26 (S26), the job creation filter 26c receives the print job data in the PCL format, and adds the PJL data stored in the pipeline propertybag 26d to this print job data.

In step S27 (S27), the job creation filter 26c outputs the print job data generated in step S26 as the ultimate print job data.

As described above, in this embodiment, the printer driver 10 operates in the PC 200 that transmits print job data to the printing devices 100, and causes this PC 200 to function as: the configuration processing unit 21 that stores the configuration information about the printer driver 10, and generates configuration data in accordance with the configuration information; the UI unit 50 that generates a print setting screen in accordance with the configuration data, and causes the display device 230 to display the print setting screen; and the drawing unit 25 that performs a drawing process on print job data generated in the PC 200, in accordance with the configuration data generated by the configuration processing unit 21. In this case, the drawing unit 25 includes the specific drawing units 27A and 27B that are prepared for the respective model groups, and are designed to perform model-group-specific drawing processes. The drawing unit 25 selects an appropriate one of the specific drawing units 27A and 27B, and performs a drawing process with the selected one of the specific drawing units 27A and 27B.

With this structure, the specific drawing unit 27A or 27B is selectively used in accordance with the model of the current printing device 100, so that a drawing process suitable for the model can be performed. Consequently, the single printer driver 10 can cope with the printing devices 100 of various models.

A V4 printer driver has functional architecture in which the configuration processing unit 21, the drawing unit 25, and the UI unit 50 are independent of one another, completely unlike the architecture of a V3 printer driver. In view of this, this embodiment is based on such architecture, and modules for the respective model groups are prepared in the drawing unit 25. With this, the single printer driver 10 can support the printing devices 100 of various models. Also, by this technique, there is no need to prepare the printer driver 10 for each model or for each model group, and the memory to be used and the memory capacity can be reduced accordingly.

In this embodiment, the drawing unit 25 further includes the common drawing unit 26 that performs a drawing process common among the models of the printing devices 100. The drawing unit 25 performs a drawing process with a selected one of the specific drawing units 27A and 27B, and the common drawing unit 26.

With this configuration, a drawing process common among the models, as well as a drawing process specific to a model group, can be performed. Thus, an appropriate drawing process can be performed on print job data. As the common drawing unit 26 performs a drawing process common among the models, each of the specific drawing units 27A and 27B does not need to have this function. Accordingly, the structure of each of the specific drawing units 27A and 27B can be simplified. As a result, the memory to be used and the memory capacity can be reduced.

In this embodiment, the drawing unit 25 selects the specific drawing unit 27A or 27B, whichever is compatible with the model group to which the model of the printing device 100 selected by the user belongs.

With this structure, the specific drawing unit 27A or 27B can be appropriately selected in accordance with the model of the printing device 100 selected by the user. Thus, a drawing process suitable for the model can be appropriately performed.

Although a printer driver and an information processing device according to an embodiment of the present invention have been described so far, the present invention is not limited to the above described embodiment, and various modifications may of course be made within the scope of the invention. The effects of the above described printer driver can be achieved not only with this printer driver but also with an information processing device operated by this printer driver. The numbers of specific drawing units and pieces of specific configuration information are merely examples, and may be changed in accordance with the models of printing devices and the model groups to which the models belong.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A nontransitory computer readable medium encoded with a program for implementing a method for operating an information processing device with a printer driver, the information processing device transmitting print job data to printing devices, the method causing the information processing device to:
    store configuration information about the printer driver, and generate configuration data for the printing devices in accordance with the configuration information;
    generate a print setting screen in accordance with the configuration data, and cause a display unit to display the print setting screen; and
    control a drawing unit to perform a drawing process on print job data generated in the information processing device, in accordance with the generated configuration data,
    wherein models of the printing devices are classified in model groups in accordance with attributes of the models of the printing devices, and each model group is associated with a model-group-specific drawing process performable by the models of the printing devices classified in the each model group and not performable by models of the printing devices not classified in the each model group,
    and wherein the drawing unit:
    includes a plurality of specific drawing units prepared for respective model groups in accordance with the attributes of models of the printing devices, each of the specific drawing units being configured to perform a model-group-specific drawing process which is associated with one of the respective model groups for which the each of the specific drawing units is prepared, and
    selects an appropriate specific drawing unit from among the plurality of specific drawing units in accordance with the configuration data, to perform a drawing process with the selected specific drawing unit.

2. The nontransitory computer readable medium according to claim 1, wherein the drawing unit
    further includes a common drawing unit configured to perform a drawing process common among models of the printing devices, and
    performs a drawing process with the selected specific drawing unit and the common drawing unit.

3. The nontransitory computer readable medium according to claim 1, wherein the information processing device selects one of the specific drawing units in accordance with the model group to which the model of a printing device selected by a user belongs, the selected printing device being of the printing devices.

4. An information processing device transmitting print job data to printing devices, the information processing device comprising:
    a hardware processor; and
    a storage device storing a printer driver to be executed by the processor,
    wherein:
    the hardware processor is configured to:
        store configuration information about the printer driver, and generate configuration data for the printing devices in accordance with the configuration information;
        generate a print setting screen in accordance with the configuration data, and cause a display unit to display the print setting screen; and
        control a drawing unit configured to perform a drawing process on print job data generated in the information processing device, in accordance with the generated configuration, wherein models of the printing devices are classified in model groups in accordance with attributes of the models of the printing devices, and each model group is associated with a model-group-specific drawing process performable by the models of the printing devices classified in the each model group and not performable by models of the printing devices not classified in the each model group, and wherein the drawing unit:

includes a plurality of specific drawing units prepared for respective model groups in accordance with the attributes of models of the printing devices, each of the specific drawing units being configured to perform a model-group-specific drawing process which is associated with one of the respective model groups for which the each of the specific drawing units is prepared, and selects an appropriate specific drawing unit from among the plurality of specific drawing units in accordance with the configuration data, to perform a drawing process with the selected specific drawing unit.

5. The information processing device according to claim 4, wherein the drawing unit further includes a common drawing unit configured to perform a drawing process common among models of the printing devices, and performs a drawing process with the selected specific drawing unit and the common drawing unit.

6. The information processing device according to claim 4, wherein the drawing unit selects one of the specific drawing units in accordance with the model group to which the model of a printing device selected by a user belongs, the selected printing, device being of the printing devices.

7. The nontransitory computer readable medium according to claim 1, wherein the configuration information includes a plurality of pieces of specific configuration information that are prepared for respective models of the printing devices and define functions of the models respectively, the configuration data is generated based on an arbitrary piece of specific configuration information that is selected from the plurality of pieces of specific configuration information, and the specific configuration information includes information on respective functions which are specific to the respective models of the printing devices and not common among the models of the printing devices.

8. The nontransitory computer readable medium according to claim 7, wherein the configuration information further includes common configuration information that defines a function that is common among the models of the printing devices, the configuration data is generated based on the selected piece of specific configuration information and the common configuration information, and the common configuration information includes information on functions which are common among the respective models of the printing devices and not specific to the respective models of the printing devices.

9. The nontransitory computer readable medium according to claim 8, wherein ultimate configuration data is generated by comparing the generated configuration data with current print settings information used by an operating system to determine whether they have corresponding print setting items, and reflecting print setting items including a print setting item of the current print settings information in a corresponding item of the generated configuration data for any corresponding print setting items, the ultimate configuration data including the reflected print setting items.

10. The nontransitory computer readable medium according to claim 7, wherein the specific configuration information is selected based on a model of the printing device selected by a user.

11. The nontransitory computer readable medium according to claim 7, wherein the print setting screen is generated based on the generated configuration data.

12. The nontransitory computer readable medium according to claim 7, wherein to the drawing unit, a condition of a drawing process is set based on the generated configuration data.

* * * * *